US012570284B2

(12) United States Patent
Vivet et al.

(10) Patent No.: US 12,570,284 B2
(45) Date of Patent: Mar. 10, 2026

(54) AUTONOMOUS DRIVING METHOD AND DEVICE FOR A MOTORIZED LAND VEHICLE

(71) Applicant: PSA AUTOMOBILES SA, Poissy (FR)

(72) Inventors: Luc Vivet, Paris (FR); Lhassane Touil, Kinitra (MA)

(73) Assignee: Stellantis Auto SAS, Poissy (FR)

( * ) Notice: Subject to any disclaimer, the term of this patent is extended or adjusted under 35 U.S.C. 154(b) by 223 days.

(21) Appl. No.: 18/041,489

(22) PCT Filed: Jul. 5, 2021

(86) PCT No.: PCT/FR2021/051225
§ 371 (c)(1),
(2) Date: Feb. 13, 2023

(87) PCT Pub. No.: WO2022/058666
PCT Pub. Date: Mar. 24, 2022

(65) Prior Publication Data
US 2023/0294691 A1      Sep. 21, 2023

(30) Foreign Application Priority Data

Sep. 21, 2020    (FR) ...................................... 2009547

(51) Int. Cl.
*B60W 30/14*        (2006.01)
*B60W 30/16*        (2020.01)
*B60W 40/105*       (2012.01)
*B60W 60/00*        (2020.01)

(52) U.S. Cl.
CPC .......... *B60W 30/143* (2013.01); *B60W 30/16* (2013.01); *B60W 40/105* (2013.01);
(Continued)

(58) Field of Classification Search
CPC .............. B60W 30/16; B60W 30/143; B60W 2552/15; B60W 2554/804; B60W 30/146;
(Continued)

(56) References Cited

U.S. PATENT DOCUMENTS 6,653,935 B1 * 11/2003 Winner .............. B60K 31/0008
340/435
2005/0251323 A1 * 11/2005 Heinrichs-Bartscher ....................
G01S 13/66
701/117
(Continued)

FOREIGN PATENT DOCUMENTS

EP          2562060 B1       10/2014
FR          3092547 B1        9/2021
WO     2020120868 A1          6/2020

OTHER PUBLICATIONS

International Search Report for PCT/FR2021/051225 mailed Oct. 10, 2021.
Written Opinion for PCT/FR2021/051225 mailed Oct. 10, 2021.

*Primary Examiner* — Wilson W Tsui
(74) *Attorney, Agent, or Firm* — Sandberg Phoenix & von Gontard, PC

(57)                ABSTRACT

The invention relates to an autonomous driving method for a motorized land vehicle, called an ego-vehicle 102, by adaptive speed regulation based on a target speed. The method is suitable for detecting a first target vehicle 104 and for calculating a relevance indicator for the first target vehicle 104, which is configured to characterize a probability of presence of the first target vehicle. Upon detection of a loss of detection of the first target vehicle 104 and if the relevance indicator is greater than a predetermined deselection value, the method calculates an autonomous driving
(Continued)

setpoint using the information on the movement of the first vehicle target 104, the target speed and the speed of the ego-vehicle 102.

10 Claims, 3 Drawing Sheets

(52) U.S. Cl.
CPC ... _B60W 60/001_ (2020.02); _B60W 2554/4041_ (2020.02); _B60W 2554/4042_ (2020.02); _B60W 2554/802_ (2020.02); _B60W 2554/804_ (2020.02)

(58) Field of Classification Search
CPC ........... B60W 40/105; B60W 50/0097; B60W 60/001; B60W 2554/4041
See application file for complete search history.

(56) References Cited

U.S. PATENT DOCUMENTS

| | | | | |
|---|---|---|---|---|
| 2007/0005218 | A1* | 1/2007 | Ueyama ................ | B60W 30/16 |
| | | | | 701/96 |
| 2009/0251355 | A1* | 10/2009 | Nanami ................ | G01S 13/867 |
| | | | | 342/70 |
| 2020/0255281 | A1* | 8/2020 | Leone ........................ | G06F 7/00 |
| 2020/0310455 | A1* | 10/2020 | Oguro .................. | G05D 1/0223 |
| 2020/0398837 | A1* | 12/2020 | Kumara ................ | B60W 30/16 |
| 2021/0018614 | A1* | 1/2021 | Yang .................... | B60W 40/10 |

* cited by examiner

[Fig. 1]
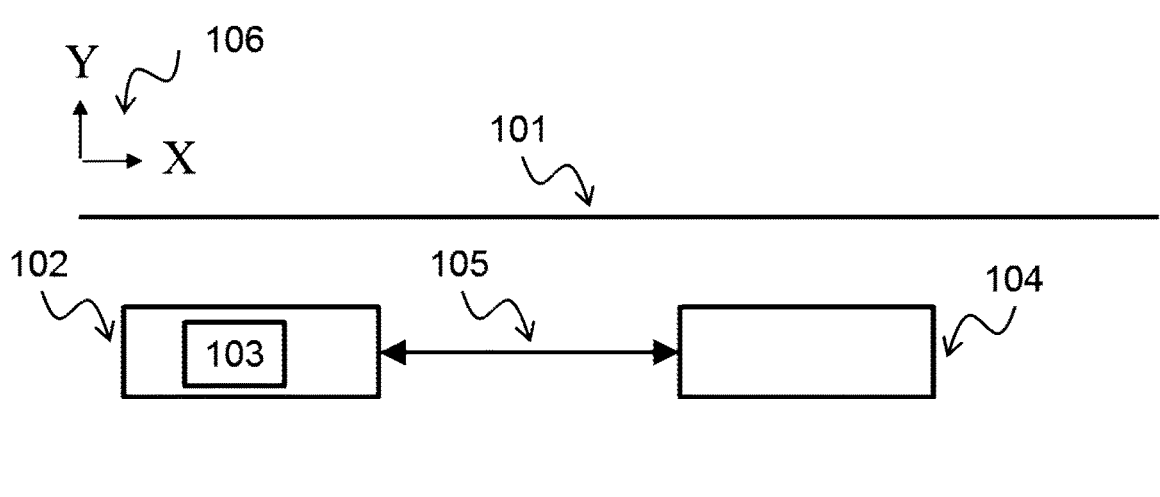

[Fig. 2]
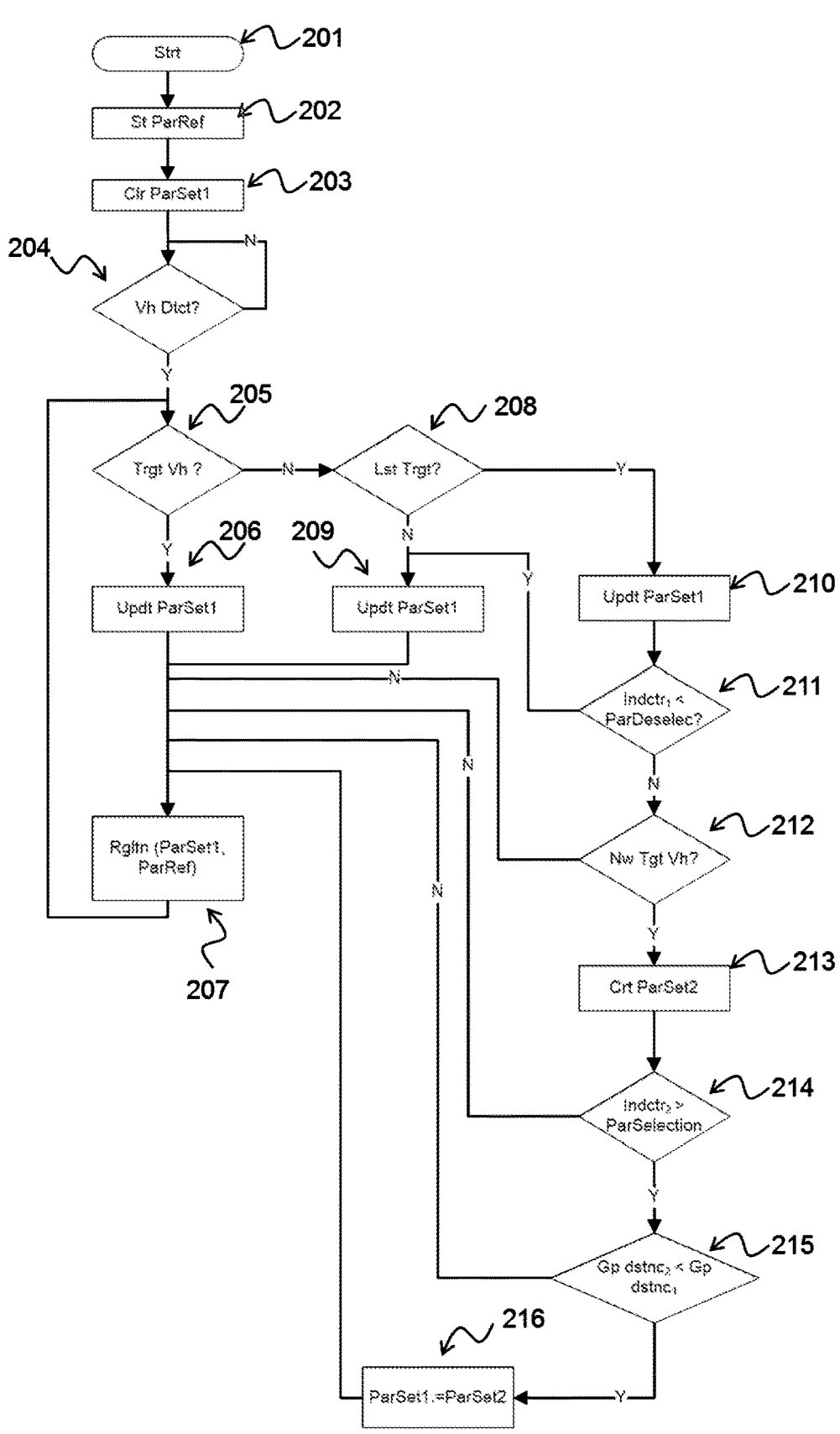

[Fig. 3]
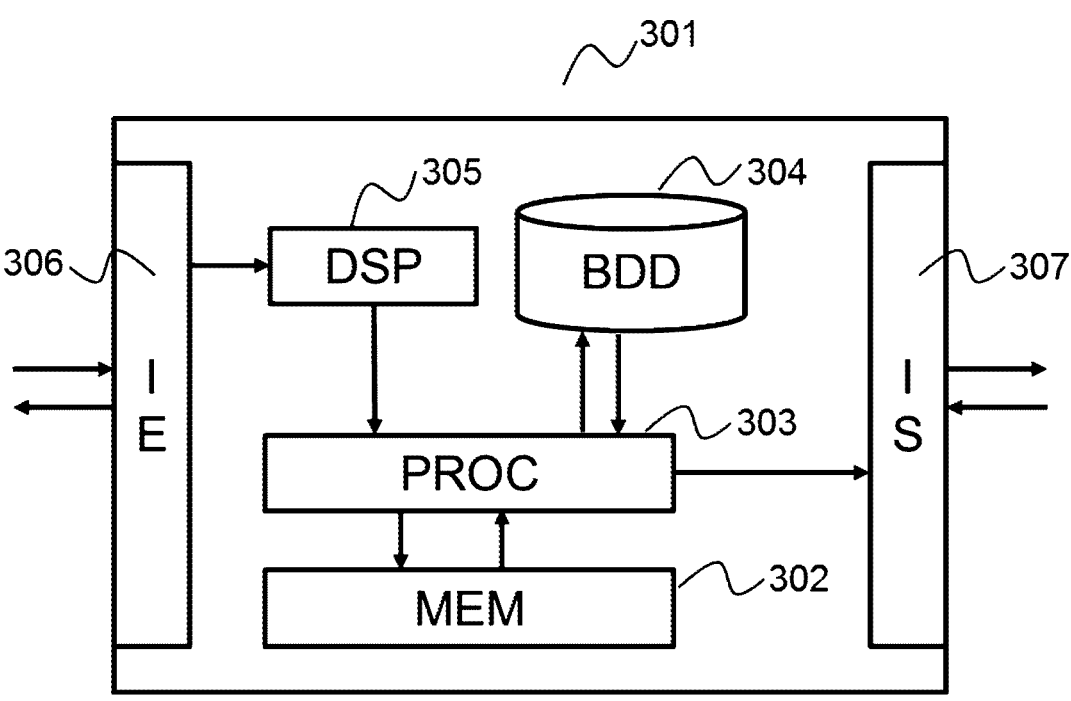

AUTONOMOUS DRIVING METHOD AND DEVICE FOR A MOTORIZED LAND VEHICLE

CROSS-REFERENCE TO RELATED APPLICATIONS

This application is the US National Stage under 35 USC § 371 of International Application No. PCT/FR2021/051225, filed 5 Jul. 2021 and which claims the priority of French application 2009547 filed on 21 Sep. 2020, the content (text, drawings and claims) of both said applications being incorporated herein by way of reference.

BACKGROUND

An autonomous driving method and device is disclosed for a motorized land vehicle, called an ego-vehicle, by adaptive speed regulation based on a target speed.

It is known that an ego-vehicle, in particular an automobile, comprises a vehicle speed regulation function. The ego-vehicle comprises components that, after activation of the vehicle speed regulation function and determination of a target speed, in particular by a driver, are able to advance the vehicle at the target speed autonomously, without any specific action by the driver. This regulation is deactivated by the driver when he detects an obstacle or a slower vehicle in front of him.

The ego-vehicle may comprise detecting means (radar, camera, etc.) configured to detect vehicles preceding it (outpacing it). A detected vehicle is also called a target vehicle. These detecting means are also capable of determining movement information of the target vehicle. For example, movement information comprises a position, a speed and/or an absolute or relative acceleration with respect to the ego-vehicle, which may or may not be associated with identification and recognition elements of the target vehicle. The identification and recognition elements of the target vehicle may be the shape, the license plate, or any attributes of the target vehicle (class, etc.). Thus, movement information makes it possible to differentiate and uniquely identify each detected vehicle. Acceleration is positive or negative, therefore including decelerations.

It is known to regulate the speed of the vehicle adaptively as a function of the movement information of the detected vehicles. This speed regulation is based on the calculation of an autonomous driving setpoint. This autonomous driving setpoint may be a target position, a target distance, a target speed, a target acceleration and/or any other nth time derivative of the position. These targets are temporarily adapted in order to maintain a minimum distance between the ego-vehicle and the detected vehicle, or a travel time between the ego-vehicle and the target vehicle, for example 2 seconds. The term "adaptive speed regulation systems" refers to those means capable of regulating the speed of the ego-vehicle in an adaptive manner.

Some of these adaptive speed regulation systems can stop (zero speed) the ego-vehicle if the target vehicle is stopped, then restart and drive the ego-vehicle forward when the target vehicle is moving again. These are so-called "Stop & Go" systems.

Unfortunately, detection of the target vehicle is sometimes faulty, mainly when cornering, on a slope, when driving over speed bumps, and also when stopping. During losses of detection of the target vehicle, there are several solutions. A first known solution is to regulate the speed of the ego-vehicle to its target speed, which is predetermined for example by the driver and which is not linked to the speed of the target vehicle. If the current speed of the ego-vehicle is much lower than the speed of the target vehicle, this leads to strong accelerations that are unpleasant for the driver and the passengers of the ego-vehicle. Also, the driver and the passengers do not understand these variations in accelerations if they can see that the target vehicle is close. A second known solution is to keep the speed of the ego-vehicle constant for a predetermined period. If the target vehicle, whose detection is lost, is in the deceleration phase, it will find itself very close to the ego-vehicle when the target vehicle is detected again. This will force the driver of the ego-vehicle to take back control and brake the ego-vehicle.

An object is to remedy the known problems during loss of detection of the target vehicle, thus improving the safety and comfort of the users of the ego-vehicle.

SUMMARY

To this end, an autonomous driving method for a motorized land vehicle, called an ego-vehicle, by adaptive speed regulation based on a target speed is provided. The method comprises the steps of:

determining movement information of a first target vehicle;

determining a speed of the ego-vehicle;

calculating a relevance indicator for the first target vehicle, which is configured to characterize a probability of presence of the first target vehicle;

upon detection of a loss of detection of the first target vehicle and if the relevance indicator is greater than a predetermined deselection value, calculating an autonomous driving setpoint using the movement information, the target speed and the speed of the ego-vehicle.

Thus, a movement (position, speed, acceleration) of the ego-vehicle compatible with the movement of the first target vehicle before the loss of detection is maintained. For example, if the first target vehicle was decelerating before the loss of detection, the ego-vehicle speed regulation will continue to decelerate the ego-vehicle. When the first target vehicle is detected again, the distance, or time to impact, will be much greater than if the speed regulation keeps the speed of the ego-vehicle constant during the loss of detection of the first target vehicle. This significantly improves safety. This also improves the feeling of comfort for the users of the ego-vehicle by avoiding, when the target vehicle is detected again, either a very strong deceleration of the ego-vehicle by the speed regulation system or an abrupt resumption of control by the driver and strong braking of the ego-vehicle.

Advantageously, upon detection of a loss of detection of the first target vehicle and if the relevance indicator is greater than a predetermined deselection value, the step of calculating an autonomous driving setpoint using the movement information, the target speed, and the speed of the ego-vehicle comprises the sub-steps of:

detecting the loss of detection of the first target vehicle;

updating the relevance indicator from a time passed since the last detection of the first vehicle;

if the relevance indicator is greater than the predetermined deselection value, calculating an autonomous driving setpoint using the movement information, the target speed and the speed of the ego-vehicle.

Thus, the relevance indicator is updated regularly as long as the first target vehicle is no longer detected. As long as this indicator is greater than the predetermined deselection value, the probability of presence of the first target vehicle is high. The autonomous driving setpoint still takes into account the last known movement information of the first target vehicle. The speed regulation system acts as if the first target vehicle is still present. In the event of new detection of the first target vehicle, the variations in acceleration of the ego-vehicle will be less abrupt, significantly improving the comfort of the users of the ego-vehicle.

Advantageously, the method further comprises the steps of:

determining movement information of a second target vehicle;
    calculating a relevance indicator for the second target vehicle, which is configured to characterize a probability of presence of the second target vehicle;
    determining a distance between the ego-vehicle and the second vehicle;
    determining a distance between the ego-vehicle and the first vehicle;
    If the relevance indicator for the second target vehicle is greater than a predetermined selection value and if the distance between the ego-vehicle and the second vehicle is smaller than the distance between the ego-vehicle and the first vehicle, calculating an autonomous driving setpoint based on the movement information of the second vehicle, the target speed, and the speed of the ego-vehicle.

Thus, the method takes into account the insertion of a second vehicle between the ego-vehicle and the first target vehicle and, if necessary, adapts the autonomous driving setpoint according to the movement information of the second target vehicle.

When cornering, it is known to lose detection of the first target vehicle and to detect another vehicle, called the second target vehicle, in an adjacent lane. The calculation of the autonomous driving setpoint does not take into account the movement information of the second target vehicle if this second target vehicle is further away than the first target vehicle. In one embodiment, the relevance indicator of the second vehicle is zero, or very low, if this second target vehicle is in another lane.

Advantageously, the method further comprises the steps of:

determining movement information of a second target vehicle;
    calculating a relevance indicator for the second target vehicle, which is configured to characterize a probability of presence of the second target vehicle;
    if the relevance indicator for the second target vehicle is greater than the updated relevance indicator for the first target vehicle, calculating an autonomous driving setpoint based on the movement information of the second vehicle, the target speed and the speed of the ego-vehicle.

Thus, in the event of detection of a second target vehicle, the calculation of the autonomous driving setpoint takes into account the movement information of the most probable target vehicle.

Advantageously, the update of the relevance indicator is calculated from the time passed since the last determination of the movement information of the first vehicle, the calculation being based on a polynomial function.

Thus, the temporal evolution of the relevance indicator is able to approximate and evolve according to numerous forms of temporal curve without complicating the calculations. By way of illustration, the polynomial function can take as an argument the time passed since the last detection.

Advantageously, updating the relevance indicator causes the relevance indicator to decrease on each update by a predetermined value characterizing a rate of decrease.

In one embodiment, each update is carried out periodically according to a fixed time step. Thus, the temporal evolution of the relevance indicator decreases linearly with respect to time at each update. This development consumes few computing resources (number of processor instructions, memory).

Advantageously, the method further comprises a step, upon detection of a loss of detection of the first target vehicle and if the relevance indicator is less than the predetermined deselection value, of calculating an autonomous driving setpoint only using the target speed and the speed of the ego-vehicle.

When the relevance indicator is lower than the predetermined deselection value, the method no longer takes into account the information of the first target vehicle. This also makes it possible to revert to known adaptive speed regulation operation.

A second aspect of the invention relates to a device comprising a memory associated with at least one processor configured to implement the method according to the first aspect of the invention.

A motorized land vehicle comprising the device is also disclosed.

Lastly, a computer program comprising instructions suitable for executing the steps of the method when said program is executed by at least one processor is disclosed.

BRIEF DESCRIPTION OF THE FIGURES

Other features and advantages of the invention will emerge from the description of the non-limiting embodiments of the invention below, with reference to the appended figures, in which:

FIG. 1 schematically illustrates an ego-vehicle and a first target vehicle.

FIG. 2 schematically illustrates a method for autonomous driving of a motorized land vehicle, called an ego-vehicle, by adaptive speed regulation based on a target speed.

FIG. 3 schematically illustrates a device which can be incorporated in a vehicle to carry out the method.

DETAILED DESCRIPTION

The invention is described below in its non-limiting application in the case of an autonomous motor vehicle traveling on a road. Other applications such as a robot in a storage warehouse or a motorcycle on a country road are also possible.

FIG. 1 schematically shows a road 101 on which an ego-vehicle 102 and a first target vehicle 104 are traveling. The ego-vehicle 102 comprises means and members 103 able to implement the method.

The ego-vehicle 102 may comprise a driving position comprising, for example, of a seat, a steering wheel, pedals (acceleration, braking, clutch) and a dashboard. As is known, operation the vehicles acceleration pedal will adjust the flow of fuel to the vehicle's motor to control the speed of the vehicle; and operation of the vehicle's brake pedal will activate the vehicle's brakes to slow (decelerate) the vehicle. Said dashboard may comprise a cockpit, a multimedia system capable of displaying audiovisual information, a head-up display system and/or an air conditioning/ventilation system.

According to one embodiment, the steering wheel and/or the dashboard comprise at least one box, steering column switch, which groups together various controls of a motor vehicle: horn, turn signal, windshield wiper, main beam, dipped beam, side marker lights, activation/deactivation of driving aids such as, for example, adaptive speed regulation, settings and/or configuration of driving aids such as, for example, defining a target speed, etc.

The ego-vehicle 102 comprises propulsion devices, for example an internal combustion engine or an electric motor, and control means which communicates with the propulsion devices to control the propulsion devices.

In one embodiment, these means and members 103 includes internal sensing means suitable for measuring or estimating the dynamics of the ego-vehicle 102, which comprises, but is not limited to, the angles, speeds and rotational accelerations of the center of gravity, or any other point, of said vehicle and the positions, speeds and accelerations (longitudinal, transverse, vertical) of the ego-vehicle expressed in at least one coordinate system 106 external, or internal, to the vehicle. As is known, such internal sensing means can comprise appropriate sensors.

In one embodiment, the means and members 103 comprise external sensing means for perceiving the environment of the vehicle. These external sensing means can sense and process light waves (camera, laser, lidar, etc.), radiofrequency waves (RADAR, WiFi, 4G, 5G, xG, etc.) and acoustic waves (ultrasound, etc.). These external sensing means are configured to detect at least one vehicle preceding the ego-vehicle, called the target vehicle. These external sensing means are also capable of determining movement information of the target vehicle, such as a position, a speed and/or an absolute or relative acceleration with respect to the ego-vehicle 102, which may or may not be associated with identification and recognition elements of the target vehicle 102. The identification and recognition elements of the target vehicle may be the shape, the license plate, or any attributes of the target vehicle (class, etc.). Thus, the movement information makes it possible to differentiate and uniquely identify each target vehicle. In FIG. 1, the double arrow 105 represents a distance between the ego-vehicle 102 and a first target vehicle 104 that is also traveling on the road 101. This distance is, for example, the shortest distance between the midpoint of the front bumper of the ego-vehicle and the midpoint of the rear bumper of the target vehicle.

In one embodiment, the means and members 103 comprises communication means which is able to communicate with the exterior of the vehicle (with other vehicles, with connected objects such as for example a telephone, a computer, etc., with roadside stations, with servers, etc.). In particular and according to another embodiment, the communication means enables the means and members 103 to determine the movement information of the target vehicle, said target vehicle transmitting the movement information to the ego-vehicle.

In one embodiment, the ego-vehicle 102 comprises at least one device, for example an autonomous driving computer, able to drive a motorized land vehicle by adaptive speed regulation based on a target speed. Adaptive speed regulation may also be based on a target longitudinal acceleration and/or a target position.

FIG. 2 schematically illustrates a method for autonomous driving of a motorized land vehicle, called an ego-vehicle 102, by adaptive speed regulation based on a target speed.

A step 201 is a step for starting, Str, or activating the adaptive speed regulation function.

A step 202 defines reference data ParRef such as for example a target speed, comprised between 0 and the maximum speed of the ego-vehicle 102, an acceleration limit, comprised between −20 m/s2 and 20 m/s2, a deselection value, for example between 0 and 0.50, a selection value, for example between 0.50 and 0.80, a value characterizing a rate of decrease, for example between 0.01 and 0.1 for a time pitch (or sampling pitch) of 1 second, the sampling pitch generally being between 0.001 and 0.1 seconds. The numerical values above are given by way of illustration and may assume any possible positive or negative value.

A step 203 initializes a set of parameters ParSet1. This set of parameters ParSet1 may for example comprise information on the movement of a first target vehicle 104, a speed of the ego-vehicle 102, a relevance indicator for the first target vehicle 104, a detection indicator for loss of detection of the first target vehicle 104, an elapsed duration, or a time, since the last detection of the target vehicle when the loss of detection of the first target vehicle is detected or since the last determination of the movement information of the first target vehicle 104, movement information of a second target vehicle, a relevance indicator for the second target vehicle, a distance between the ego-vehicle 102 and the first target vehicle 104, a distance between the ego-vehicle and the second target vehicle, the current and/or past position/speed/acceleration of the ego-vehicle 102, etc., and any other parameters used hereinafter in the adaptive speed regulation.

During a step 204, it is tested whether a target vehicle is detected. If it is not, step 204 remains, and speed regulation is established according to the known state of the art. If it is, the method proceeds to a step 205.

Step 205 tests whether the detected vehicle is the first target vehicle 104, Trgt Vh. If it is, the method proceeds to a step 206. If it is not, the method proceeds to a step 208.

In step 206, the first target vehicle 104 has already been detected and it continues to be detected. This step makes it possible to update the set of parameters ParSet1, which is initialized in step 203 described above, and updated in step 206 or a step 209 described below. In particular, by way of non-limiting illustration, the movement information of the first target vehicle 104, Trgt Vh, is determined, the speed of the ego-vehicle 102 is determined and a relevance indicator for the first target vehicle 104 is calculated. For example, the relevance indicator can increase and approach 1 if the vehicle is detected several times in succession.

A step 207 carries out the speed regulation of the ego-vehicle 102. It is also the step following step 209 or one of steps 212, 214, 215, 216 described below.

Each time, the set of parameters ParSet1 has been updated by during one of steps 206, 209, 212, 214, 215, 216.

Step 207 may comprise several sub-steps. For example, in one of the sub-steps, an autonomous driving setpoint is calculated based on the set of parameters ParSet1 and on the reference data ParRef. Then, the means and members 103 are capable of implementing speed regulation based on the autonomous driving setpoint (position, speed, acceleration, etc.). In one embodiment, upon detection of a loss of detection of the first vehicle, if the relevance indicator is greater than a predetermined deselection value, an autonomous driving setpoint is calculated using the movement information, the target speed and the speed of the ego-vehicle 102. In another operating mode, upon detection of a loss of detection of the first vehicle, if the updated relevance indicator is greater than a predetermined deselection value, an autonomous driving setpoint is calculated using the movement information, the target speed and the speed of the ego-vehicle 102.

Step 208 is reached if the first target vehicle 104 is not detected during step 205. It is tested whether the loss of detection of the first target vehicle 104 is detected. If not, no previous first target vehicle 104 is detected. We then arrive at step 209, which initializes the set of parameters ParSet1 just like in step 203, and which determines the values of all the parameters of the set of parameters ParSet1. In this step, the detected vehicle becomes the first target vehicle 104. For example, the set of parameters ParSet1 comprises the determination of movement information of a first target vehicle 104, the determination of a speed of the ego-vehicle 102, the calculation of a relevance indicator Indctr1 for the first target vehicle 104 configured to characterize a probability of presence of the first target vehicle 104, etc. By way of illustration, this relevance indicator Indctr1 can be:

- a value very close to 1, for example 0.9, if several means and members among the members and means 103 have detected and identified this vehicle;
- a value between 0 and 1 and less than the above value, if the vehicle is detected by a single member.

At the end of step 209, the method proceeds to step 207, which performs the speed regulation of the ego-vehicle 102 as described above.

When a step 210 is reached, a first target vehicle 104 has been detected and the loss of detection of said first target vehicle 104 has been determined. All or part of the parameter set ParSet1 is updated. In particular, the determination of the speed of the ego-vehicle 102, of the relevance indicator Indctr1 for the first target vehicle 104 and of the time elapsed since the last determination of the movement information of the first vehicle is updated.

In one operating mode, the update of the relevance indicator is calculated from the time passed since the last determination of the movement information of the first vehicle, the calculation being based on a polynomial function. This polynomial function may depend on one or more indeterminates (arguments). Advantageously, one of the indeterminates is the time passed since the last detection.

In another embodiment, the relevance indicator decreases by a predetermined value characterizing a rate of decrease.

A step 211 tests whether the relevance indicator is less than the predetermined deselection value ParDeselec. Advantageously, this threshold is between 0 and 1, and close to 0.4. If it is, the method proceeds to step 209 as described above.

If it is not, the method proceeds to step 212, which tests whether a second target vehicle is detected. If it is not, the method proceeds to step 207, which performs the speed regulation of the ego-vehicle 102 as described above with the set of parameters ParSet1 updated in step 210. If it is, the method proceeds to a step 213.

Step 213 is reached if a second target vehicle has been detected. This step 213 initializes a new set of parameters ParSet2, similar to the set of parameters ParSet1. For example, the parameter set ParSet2 contains:

- determining movement information of a second target vehicle;
- calculating a relevance indicator for the second target vehicle, which is configured to characterize a probability of presence of the second target vehicle. Advantageously, the calculation is similar to that described in step 209;
- determining a distance between the ego-vehicle and the second vehicle;
- determining a distance between the ego-vehicle and the first vehicle.

Step 214 follows step 213. In step 214, it is tested whether the relevance indicator for the second target vehicle Indctr2 is greater than the predetermined selection value (see step 202). If it is not, the method proceeds to step 207, which performs the speed regulation of the ego-vehicle 102 as described above with the set of parameters ParSet1 updated in step 210.

If the test of step 214 is affirmative, the method proceeds to step 215, which tests whether the distance between the ego-vehicle and the second vehicle is smaller than the distance between the ego-vehicle and the first vehicle. If it is not, the method proceeds to step 207, which performs the speed regulation of the ego-vehicle 102 as described above with the set of parameters ParSet1 updated in step 210.

If the test of step 215 is affirmative, the method proceeds to step 216, which replaces the set of parameters ParSet1 with the new set of parameters ParSet2. The second target vehicle now becomes the first target vehicle 104. The method then proceeds to step 207, which performs the speed regulation of the ego-vehicle 102 as described above with the set of parameters ParSet1, which has been replaced by the set of parameters ParSet2.

FIG. 3 shows an example of a device 301 included in the vehicle, in a network ("cloud"), or on a server. This device 301 can be used as a centralized device in charge of at least certain steps of the method described above with reference to FIG. 2. In one embodiment, it corresponds to an autonomous driving computer.

In the one embodiment, the device 301 is included in the vehicle.

This device 301 may take the form of a box comprising printed circuits for any type of computer or even for a mobile telephone ("smartphone").

The device 301 comprises a random access memory 302 for storing instructions for the implementation by a processor 303 of at least one step of the method as described above. The device also comprises a mass memory 304 for storing data that are intended to be kept after the method has been implemented.

The device 301 may further comprise a digital signal processor (DSP) 305. This DSP 305 receives data in order to format, demodulate, and amplify these data in a manner that is inherently known.

The device 301 also comprises an input interface 306 for receiving the data implemented by the method according to the invention and an output interface 307 for transmitting the data implemented by the method.

The disclosed method is not limited to the embodiments described above, which are disclosed only by way of example, but rather the method extends to other variants.

Thus, an embodiment of autonomous driving of a motorized land vehicle has been described above. Of course, this embodiment can be adapted to autonomous, driverless motorized land vehicles. Of course, the invention as claimed is not limited to the embodiment described and shown, but encompasses any variant embodiment.

The invention claimed is:

1. An autonomous driving method for controlling the speed of a motorized land vehicle, called an ego-vehicle, by adaptive speed regulation based on a target speed, the ego-vehicle comprising:

- internal sensing means for electronically measuring or estimating dynamics of the ego-vehicle,
- external sensing means for perceiving an environment of the ego-vehicle, and
- an autonomous driving computer adapted to regulate the speed of the ego-vehicle based on a target speed; said autonomous driving computer being in communication with said internal sensing means and said external sensing means to receive information from said internal sensing means and external sensing means; said autonomous driving computer regulating a speed of the ego-vehicle in response to output received from said internal sensing means and external sensing means; the method comprising the steps of:

said autonomous driving computer receiving information from said external sensing means indicative of the presence of a first target vehicle;

said autonomous driving computer electronically determining movement information of the first target vehicle based on said information from said external sensing means;

said autonomous driving computer receiving information from said internal sensing means regarding dynamics of the ego-vehicle and electronically determining a speed of the ego-vehicle based on said information from said internal sensing means;

said autonomous driving computer calculating a first relevance indicator for the first target vehicle, the relevance indicator being indicative of a probability of presence of the first target vehicle in front of said ego-vehicle;

wherein when said autonomous driving computer based on the first relevance indicator determines a loss of detection of the first target vehicle, when the first relevance indicator is greater than a predetermined deselection value, said autonomous driving computer calculates an autonomous driving setpoint as a function of the movement information of the first target vehicle, the target speed of the ego-vehicle, and the speed of the ego-vehicle;

said autonomous driving computer updating the first relevance indicator from a time passed since the last detection of the first vehicle; and when the relevance indicator is greater than the predetermined deselection value, said autonomous driving computer calculating an autonomous driving setpoint as a function of the movement information of the target vehicle, the target speed of the ego-vehicle, and the speed of the ego-vehicle; and wherein when said autonomous driving computer, based on information received from said external sensing means, determines the presence of a second target vehicle, said method includes:

said autonomous driving computer determining movement information of said second target vehicle based on information received from said external sensing means;

said autonomous driving computer calculating a second relevance indicator for the second target vehicle, said second relevance indicator being indicative of a probability of a presence of the second target vehicle;

said autonomous driving computer determining a distance between the ego-vehicle and the second target vehicle, said autonomous driving computer determining a distance between the ego-vehicle and the first target vehicle, and when the second relevance indicator for the second target vehicle is greater than a predetermined selection value and when the distance between the ego-vehicle and the second target vehicle is smaller than the distance between the ego-vehicle and the first target vehicle, said autonomous driving computer calculating an autonomous driving setpoint based on the movement information of the second target vehicle, the target speed and the speed of the ego-vehicle, and regulating the ego vehicle's speed by controlling acceleration or deceleration of the ego-vehicle based on the calculated autonomous driving setpoint.

2. The method according to claim 1, wherein the method further comprises the steps of said autonomous driving computer:

updating said second relevance indicator for the second target vehicle, which is configured to characterize a probability of presence of the second target vehicle;

when the second relevance indicator for the second target vehicle is greater than the updated relevance indicator for the first target vehicle, calculating said autonomous driving setpoint based on the movement information of the second vehicle, the target speed of the ego-vehicle, and the speed of the ego-vehicle.

3. The method according to claim 1, wherein in said step of updating the first relevance indicator the update of the first relevance indicator for the first vehicle is calculated from a time passed since a last determination of the movement information of the first target vehicle, the calculation being based on a polynomial function.

4. The method according to claim 1, wherein said step of updating the first relevance indicator causes the first relevance indicator to decrease on each update by a predetermined value characterizing a rate of decrease.

5. The method according to claim 1, wherein when said autonomous driving computer determines a loss of detection of the first target vehicle and when the first relevance indicator is less than the predetermined deselection value, said autonomous driving computer calculates said autonomous driving setpoint only using the target speed and the speed of the ego-vehicle.

6. The method according to claim 1 wherein said internal sensing means includes one or more sensors adapted to measure or estimate one or more of angles, speeds and rotational accelerations of a center of gravity of said ego-vehicle and positions, speeds and accelerations of the ego-vehicle.

7. The method according to claim 1 wherein said external sensing means comprises one or more of the following:

means for sensing light waves, means for sensing radiofrequency waves; and means for sensing acoustic waves.

8. The method according to claim 1 wherein the first relevance indicator increases when the target vehicle is detected several times in succession.

9. A computer product comprising a non-transitory computer readable storage medium storing computer instructions that when executed by at least one processor carry out the steps of the method according to claim 1.

10. A motorized land vehicle comprising the computer product of claim 9.

* * * * *